Nov. 18, 1958

H. MÜLLER 2,860,419

FEELER-PIN MEASURING DEVICES

Filed Feb. 5, 1954

INVENTOR
HANNS MÜLLER,
by John B Brady
ATTORNEY

Nov. 18, 1958    H. MÜLLER    2,860,419
FEELER-PIN MEASURING DEVICES
Filed Feb. 5, 1954    2 Sheets-Sheet 2
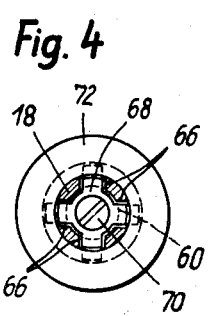
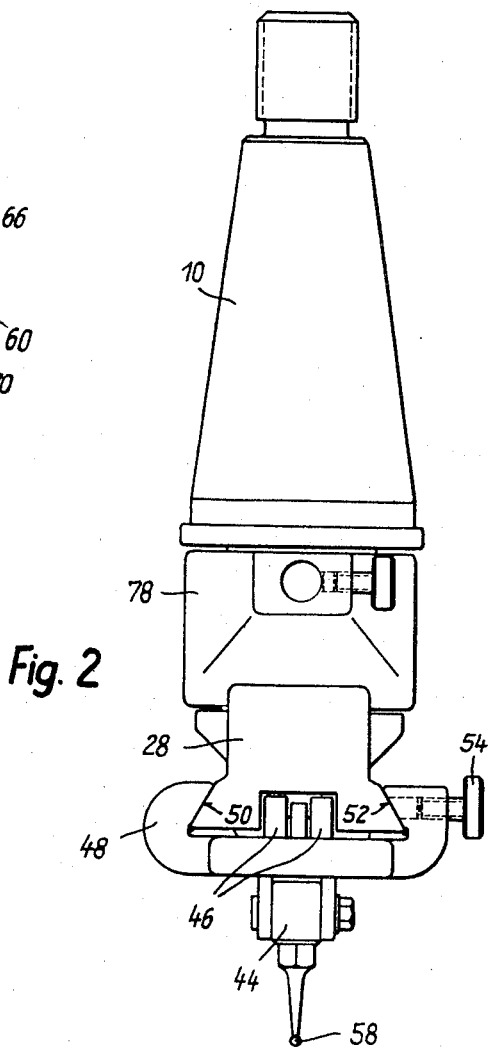
INVENTOR
HANNS MÜLLER,
by John B. Brady
ATTORNEY United States Patent Office 2,860,419
Patented Nov. 18, 1958

2,860,419

FEELER-PIN MEASURING DEVICES

Hanns Müller, Munich, Germany, assignor to Hans Deckel, Munchen-Solln, and Friedrich Wilhelm Deckel, Post Tutzing, Germany Application February 5, 1954, Serial No. 408,535

Claims priority, application Germany February 13, 1953

5 Claims. (Cl. 33—172)

My invention relates to a feeler-pin measuring device of the kind comprising a feeler-pin or lever, a transmitting linkage, and a dial indicator contained as an integral assembly in a holder or carrier fitting into and driven by a spindle. Such devices can for instance be employed in machine tools with rotatable spindles such as lathes, drills, millers and so on, in particular for centering a workpiece of circular or cylindrical shape with reference to the spindle axis, or to determine the concentric location of internal and external diameters in a workpiece, or for any similar measuring or gauging operations.

The present invention furthermore differs from other known feeler measuring devices in the feature, that simultaneously, on the one hand, the dial indicator is stationary, while on the other hand, the measured value indicated thereupon is independent of the respective diameters, so that the indicator scale can be provided with uniform calibrations.

Other feeler devices, in which the dial gauge is held stationary during the measuring operation, are known; however, with each variation of the diameter, either the angle of the feeler pin is varied or its pivot point will be moved with regard to the remaining transmission parts. This has the disadvantageous effect that when varying the diameter, the transmission ratio will also be varied, so that the dial gauge cannot be provided with an indicator scale having uniform calibrations which are valid for all diameters.

On the other hand, there is also known a feeler device, where, similar to my invention, the transmission ratio remains independent of the respective diameter. This device, however, has the disadvantage that the dial gauge is not held stationary, but executes a circular movement during the machining operation. Therefore, it is not possible, especially at higher speeds, to observe the movement of the dial and the indication of the dial gauge with accuracy and in various positions the dial will even be covered by other parts of the device.

Feeler-pin gauges on drilling machines are also known, in which the feeler-pin or lever with a part of the transmitting linkage is rigidly fitted inside the drilling head, while the dial gauge is arranged to one side of the drill slide and rigidly attached thereto. Contrary to the forms of construction representing a self-contained, independent unit, this form of measuring device forms an integral part of the machine tool or the drilling slide respectively. A disadvantage again results because the position of the dial indicator varies in height according to the position of the drilling head, and the radial direction is not adjustable at will with reference to the operating position but varies in accordance with conditions of work.

The object of the present invention is to provide an assembly which eliminates the disadvantages of the known forms of such measuring devices by producing a measuring device wherein the indications can be readily and correctly observed by the attendant and whereby the handling and operation of the device is greatly simplified.

To the attainment of this object and in accordance with the invention the dial indicator is arranged on the device so as to be prevented from rotation by a locking element engaging with a fixed part of the machine and so remains stationary in a preset position during rotation and movement of the spindle, the feeler-pin, and the transmitting linkage, respectively.

The invention will be more fully understood from the following specification which sets forth a representative embodiment of the invention by reference to the accompanying drawings wherein:

Fig. 2 is a side elevation of the embodiment of the invention removed from the machine spindle;

Fig. 4 is a fragmentary section on line 4—4 of Fig. 1 showing the connecting means between the pin and the spider of the feeler-pin assembly.

Figures 1, 3:
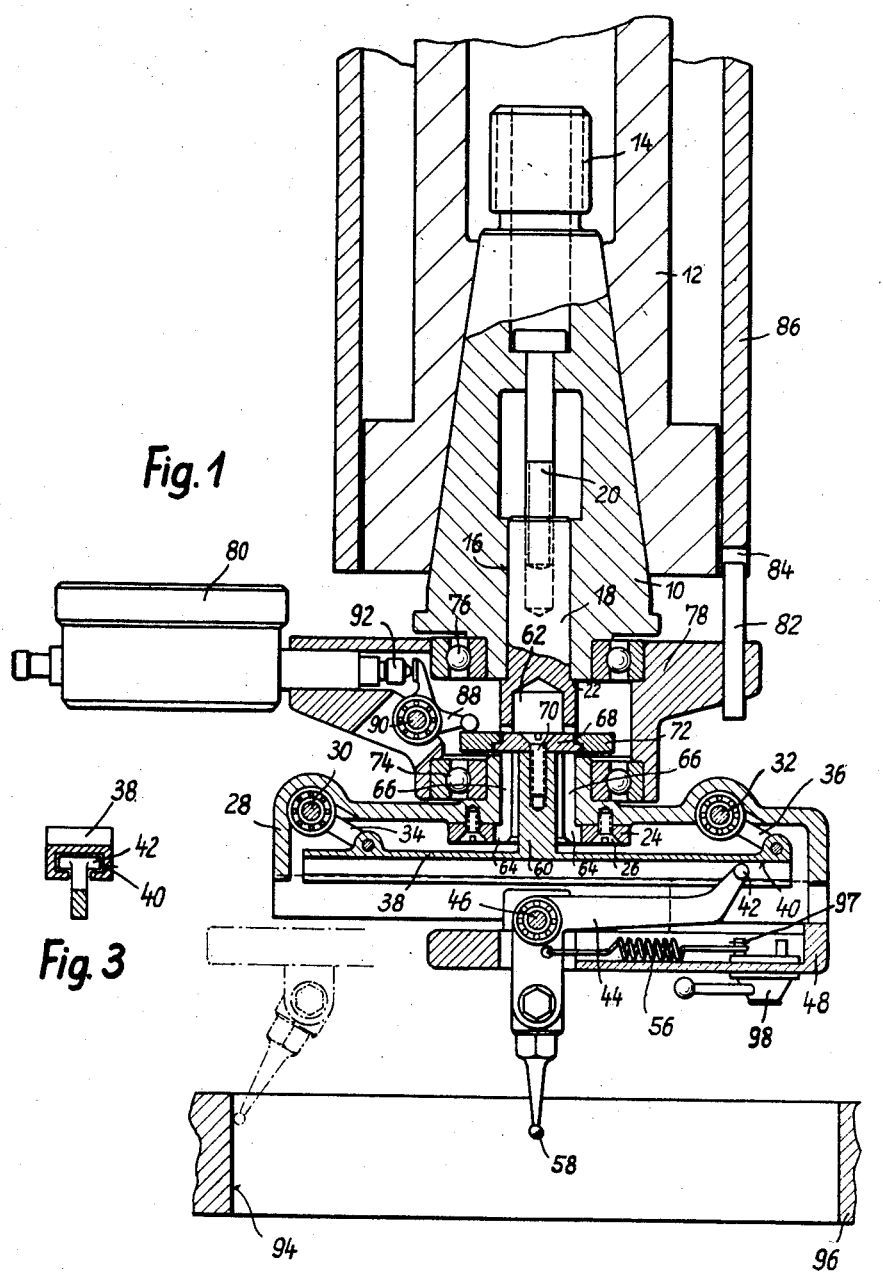
Figure 1 represents a preferred embodiment of the invention in vertical section with portions shown in side elevation, the invention being illustrated as applied to a machine spindle.
Fig. 3 is a fragmentary vertical section taken substantially on line 3—3 of Fig. 1 and illustrating the connection between the end of the bell-crank feeler and the crosshead of the carrier which supports the mechanism constituting the invention.

The illustrated feeler-pin measuring device is supported on a tapered arbor 10 adapted to fit inside the spindle 12 of the machine tool and to be secured therein in the usual manner by means of a tapped plug 14. The tapered arbor 10 has an axial bore 16 containing a pivot pin 18 which is retained by a screw 20 located within the tapered arbor 10 in such manner that the stepped shoulder 22 of the pin bears against the end face of the tapered arbor. The pivot pin 18 has at its lower end a transverse flange 24 to which a caplike carrier 28 is attached by means of screws 26 in such a manner as to follow the rotation of the machine spindle 12 and therefore the tapered arbor 10 and the pivot pin 18 of the measuring device.

The carrier 28 contains an oscillating linkage provided with two link rods 34, 36, and a crosshead 38, the link rods being journalled in bearings 30, 32 in carrier 28. The under side of the crosshead has a U-shaped guide slot 40 (Figs. 1 and 3) in which the correspondingly shaped end 42 of a ball-crank feeler 44 is able to slide. This feeler element is journalled at 46 in a slide 48 which is movable in dovetailed guides 50, 52 (Fig. 2) on the outside of the carrier 28 and which is secured or fixed in position by a clamping screw 54. The feeler 44 is loaded or unloaded by a spring 56 in order to maintain its tracer point 58 in contact with the test surface. The spring 56 represented in Fig. 1 is normally positioned so that it does not affect the feeler 58. The necessary contact between test sample 96 and feeler 58 during the testing of inner diameters i. e. drillings, is performed by a spring (not shown) installed in the dial gauge 80. When testing outer diameters the spring 56 is first loaded by displacing one of its anchor points 97 by means of a rotatable adjusting key 98 which is depicted in Fig. 1 below the part 48. Anchor point 97 is eccentric to the axis of rotation of the rotatable adjusting key 97 so that spring 56 can be stretched as the anchor point is displaced. Thus the spring can be made variably effective.

The crosshead 38 of the aforesaid link motion has a central hub 60 projecting upwards into the bore 62 of the pin 18. This pin has in its lower end face four cross-wise grooves 64 merging into four slots 66 extending over approximately the whole length of the bore 62 and thus dividing the wall of the pivot pin 18 in this region. It is thus possible to introduce a spider 68 (Figs. 1 and 4) into the bore of the pin 18 and secure it in the end of the hub 60 by means of a screw 70 in such a manner that its limbs project from the circumference of the pin 18 and form bearing surfaces for a feeler ring 72, itself surrounding the pin 18. A swinging motion of the crosshead 38, therefore, transmits its axial component, i. e., its stroke, to the feeler ring 72. The crosshead 38 has a substantially rectangular hollow interior section in which the end 42 of the feeler pin 44 is slidable.

A bearing member 78 for a dial indicator 80 is supported in two bearings 74, 76 concentric with pin 18. In order that this member 78 will not be caused to follow the rotation of the elements 10, 18, 28, a stop pin 82 is made to engage in one of the locking grooves 84 of a fixed sleeve 86 surrounding the machine tool spindle 12. A bell-crank lever 88 journalled in a bearing 90 in the stationary member 78, transmits the stroke or lift of the feeler ring 72 to the feeler-pin 92 of a dial indicator 80.

The described device acts in the following manner:

When it is required, for instance, to verify the centering of a bore 94 in a work piece 96 with reference to the axis of the machine tool spindle 12, the slide 48 is first moved along the guides 50, 52 (Fig. 2) until the tracer point 58 of the feeler 44 makes contact with the wall of the bore 94. The slide 48 is then fixed in this position by the clamping screw 54. When thereafter the spindle 12 and therefore the elements 10, 18, 28, 48 and 58 of the device are rotated, the tracer point 58 traces the profile of the bore 96 and is deflected in the process, such deflection being transmitted by the end 42 of the feeler-pin 44 to the crosshead 38 to which it thus imparts a slight oscillatory motion. These oscillations are transmitted through the spider 68 to the feeler ring 72 in the form of an axial thrust which again is communicated through the bell-crank lever 88 to the dial gauge 80, 92 and is indicated there in known manner by deflection of the needle or pointer over the dial. In accordance with the indications of the dial gauge, the work piece 96 with its bore 94 can be centrally located with reference to the axis of the spindle 12 by the usual adjusting means.

By virtue of the arrangement of the transmitting elements between the tracer point of the feeler and the dial gauge, it is possible to retain the member 78 carrying the dial gauge 80 in any preset, most advantageous position in such manner that the process of gauging and adjustment can be easily and reliably supervised and controlled by the attendant.

The device can be used to gauge, not only bores, but also external diameters or plane surfaces.

While I have described one of the preferred embodiments of my invention I realize that modifications may be made and I desire that it be understood that no limitations upon my invention are intended other than may be imposed by the scope of the appended claims.

What I claim and desire to secure by Letters Patent of the United States is:

1. A feeler device comprising a holder rotatably driven about an axis of rotation, a bearing member mounted on said holder, a locking element engaging said bearing member and holding it in a pre-set stationary position, a carrier connected with said holder for common rotating movement, a slide provided on said carrier and capable of adjustment approximately transverse to said axis of rotation, a feeler lever movably mounted on said slide, an indicator provided on said bearing member, and a bell crank carried by said holder and adjustable transversely to the axis of rotation of said holder for transmitting the movement of said feeler lever to said indicator while said indicator remains stationary in the pre-set position.

2. A feeler device as set forth in claim 1, in which said carrier includes a crosshead extending approximately transverse to said axis of rotation and a plurality of parallel links mounted on said carrier for pivotally mounting said crosshead within said carrier, the feeler lever engaging said crosshead for the purpose of effecting pivotal movement thereof.

3. A feeler device as set forth in claim 1, in which said carrier includes a crosshead extending approximately transvere to said axis of rotation and pivotally mounted with respect to said carrier by means of a parallel link motion, the feeler lever engaging said crosshead for effecting a pivotal movement thereof, and wherein said slide carrying the feeler lever is adjustable in the longitudinal direction of said crosshead.

4. A feeler device as set forth in claim 1 in which said carrier includes a crosshead having a substantially rectangular hollow interior section and wherein said feeler lever terminates at one end in a member slidably confined within said crosshead and displaceable therein according to the movement of said feeler lever.

5. A feeler device as set forth in claim 1 in which said carrier includes a crosshead pivotally suspended at opposite ends from spaced positions on said carrier and in which said feeler lever is slidably connected with said crosshead in a position intermediate the pivotal suspension thereof.

References Cited in the file of this patent

UNITED STATES PATENTS

| | | |
|---|---|---|
| 734,182 | Kelley | July 21, 1903 |
| 1,241,469 | Payne | Sept. 25, 1917 |
| 1,264,910 | Elsasser | May 7, 1918 |
| 1,373,319 | Ferrand | Mar. 29, 1921 |
| 1,723,529 | Schwieterman | Aug. 6, 1929 |
| 2,209,628 | Munson | July 30, 1940 |
| 2,466,380 | Clark | Apr. 5, 1949 |
| 2,483,743 | Turrettini | Oct. 4, 1949 |